(12) United States Patent
Wu et al.

(10) Patent No.: US 12,185,087 B2
(45) Date of Patent: Dec. 31, 2024

(54) METHODS AND APPARATUSES FOR END-TO-END FLOW CONTROL

(71) Applicant: LENOVO (BEIJING) LIMITED, Beijing (CN)

(72) Inventors: Lianhai Wu, Beijing (CN); Jing Han, Beijing (CN); Haiming Wang, Beijing (CN); Zhi Yan, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 359 days.

(21) Appl. No.: 17/642,913

(22) PCT Filed: Sep. 30, 2019

(86) PCT No.: PCT/CN2019/109358
§ 371 (c)(1),
(2) Date: Mar. 14, 2022

(87) PCT Pub. No.: WO2021/062597
PCT Pub. Date: Apr. 8, 2021

(65) Prior Publication Data
US 2022/0408308 A1    Dec. 22, 2022

(51) Int. Cl.
*H04W 28/08*    (2023.01)
*H04W 28/02*    (2009.01)

(52) U.S. Cl.
CPC ... *H04W 28/0958* (2020.05); *H04W 28/0236* (2013.01); *H04W 28/0289* (2013.01)

(58) Field of Classification Search
CPC ............ H04W 48/20; H04W 28/0958; H04W 28/0236; H04W 28/0289
See application file for complete search history.

(56) References Cited

U.S. PATENT DOCUMENTS

| | | | |
|---|---|---|---|
| 11,843,968 B2* | 12/2023 | Lee | H04W 40/12 |
| 2017/0006499 A1 | 1/2017 | Hampel et al. | |
| 2020/0053682 A1* | 2/2020 | Abedini | H04W 74/0833 |
| 2020/0322976 A1* | 10/2020 | Islam | H04W 56/0015 |
| 2021/0119920 A1* | 4/2021 | Tesanovic | H04W 28/0278 |

(Continued)

FOREIGN PATENT DOCUMENTS

CN    106034343 A    10/2016

OTHER PUBLICATIONS

International Searching Authority, "Written Opinion of the International Searching Authority," PCT/CN2019/109358, Jun. 17, 2020, pp. 1-4.

(Continued)

*Primary Examiner* — Mehmood B. Khan
(74) *Attorney, Agent, or Firm* — Kunzler Bean & Adamson (57) ABSTRACT

Embodiments of the present disclosure relate to methods and apparatuses for end-to-end flow control. According to an embodiment of the present disclosure, a method includes: determining whether congestion happens at an IAB node; and transmitting a message to a donor node in response to determining that the congestion happens at the IAB node, wherein the message comprises at least one of: (1) a first message indicating the congestion associated with a radio link control channel; or (2) a second message indicating the congestion associated with a parent node of the IAB node.

20 Claims, 8 Drawing Sheets

(56) References Cited

U.S. PATENT DOCUMENTS

| | | | | |
|---|---|---|---|---|
| 2021/0127293 A1* | 4/2021 | Hong | ................ | H04W 28/0278 |
| 2022/0312471 A1* | 9/2022 | Huang | ................ | H04W 52/365 |
| 2022/0345202 A1* | 10/2022 | Huang | ................. | H04L 1/1896 |

OTHER PUBLICATIONS

Huawei, Hisilicon, Congestion reporting and handling for IAB nerworks, 3GPP TSG-RAN WG2#106, R2-1906067, May 13-17, 2019, pp. 1-3, Reno, USA.

ZTE Corporation, Sanechips, Discussion on flow control in IAB, 3GPP TSG RAN WG2 Meeting #106, R2-1906556, May 13-17, 2019, pp. 1-5, Reno, USA.

Intel Corporation, Network coding for Release 17 IAB, 3GPP TSG RAN Meeting #85, RP-192206, Sep. 16-20, 2019, pp. 1-9, Newport Beach, USA.

Intel Corporation, Network coding for Release 17 IAB, 3GPP TSG RAN Meeting #84, R2-191346, Jun. 3-6, 2019, pp. 1-8, Newport Beach, USA.

\* cited by examiner

METHODS AND APPARATUSES FOR END-TO-END FLOW CONTROL

TECHNICAL FIELD

The present disclosure relates to wireless communications, and more particularly, to methods and apparatuses for end-to-end flow control in an integrated access and backhaul (IAB) system.

BACKGROUND

In the 3rd Generation Partnership Project (3GPP), deployment of relay nodes (RNs) in a wireless communication system is promoted. One objective for deploying RNs is to enhance coverage area of a base station (BS, also called gNB in 5G networks) by improving the throughput of a mobile device (also known as a user equipment (UE)) that locates in a coverage hole or far from the BS, which can result in relatively low signal quality.

In a wireless communication system which employs RNs, a BS that can provide connection to at least one RN is called a donor BS (or a donor node or a donor). An RN is connected to a donor BS by a backhaul link. The RN may hop through one or more RNs before reaching the donor BS, or may be directly connected to the donor BS. For the new radio (NR) communication networks, 3GPP is envisioning an IAB architecture for supporting multi-hop relays, wherein a donor node with multi-connectivity is also supported by an IAB node. That is, the IAB node has a plurality of active routes to the donor BS via multiple parent IAB nodes (also called "serving IAB nodes"). A multi-hop network may provide more range extension than a single-hop network. This is relatively more beneficial with respect to wireless communications at frequencies above 6 GHz, which have limited ranges when using single-hop backhauling. Multi-hop backhauling further enables backhauling around obstacles, e.g., buildings in an urban environment for in-cluster deployments.

In an IAB system, congestion or overload may occur at an accessing IAB node, which can be directly accessed by a UE, or an intermediate IAB node between a donor node and the accessing IAB node. An IAB node may have more than one parent node or more than one child node. These factors may increase difficulties in flow control. Thus, improved methods for flow control are required for an IAB system to support multi-hop backhauling and multi-connectivity.

SUMMARY OF THE DISCLOSURE

An object of the embodiments of the present disclosure is to provide methods and apparatuses for end-to-end flow control, which can be used in an IAB system. "End-to-end" means that a distributed unit (DU) of an IAB node reports to a central unit (CU) of a donor node, rather than to a DU part of a parent node of the IAB node.

According to an embodiment of the present disclosure, a method includes: determining whether congestion happens at an IAB node; and transmitting a message to a donor node in response to determining that the congestion happens at the IAB node, wherein the message comprises at least one of: (1) a first message indicating the congestion associated with a radio link control channel; or (2) a second message indicating the congestion associated with a parent node of the IAB node.

According to another embodiment of the present disclosure, a method includes: receiving, at a donor node, a message indicating that congestion happens at an IAB node, wherein the message comprises at least one of: (1) a first message indicating the congestion associated with a radio link control channel; or (2) a second message indicating the congestion associated with a parent node of the IAB node; and taking an action to reduce the congestion at the IAB node in response to receiving the message.

According to yet another embodiment of the present disclosure, an apparatus includes: at least one non-transitory computer-readable medium having computer executable instructions stored therein; at least one receiver; at least one transmitter; and at least one processor coupled to the at least one non-transitory computer-readable medium, the at least one receiver, and the at least one transmitter. The computer executable instructions are programmed to implement a method according to any one of the embodiments of the present disclosure, which will be described below, with the at least one receiver, the at least one transmitter, and the at least one processor.

Embodiments of the present disclosure solve issues about end-to-end flow control in an IAB system, which can improve and facilitate the implementation of the IAB system.

BRIEF DESCRIPTION OF THE DRAWINGS

In order to describe the manner in which advantages and features of the present disclosure can be obtained, a description of the disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only forms in which the present disclosure may be practiced. It is to be understood that the same or equivalent functions may be accomplished by different embodiments that are intended to be encompassed within the spirit and scope of the present disclosure.

Figure 1A:
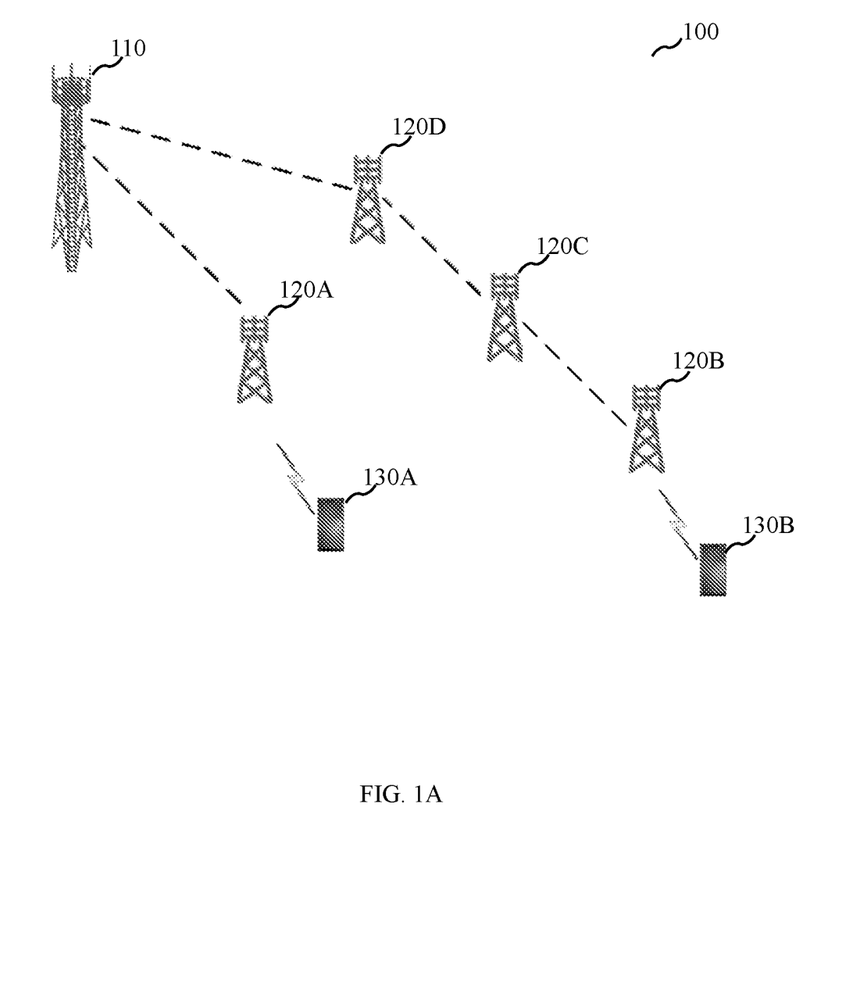
FIG. 1A illustrates an exemplary IAB system according to some embodiments of the present disclosure.

FIG. 1A illustrates an exemplary IAB system 100 according to some embodiments of the present disclosure.

Referring to FIG. 1A, the IAB system 100 can include an IAB donor node (e.g., donor node 110), some IAB nodes (e.g., IAB node 120A, IAB node 120B, IAB node 120C, and IAB node 120D), and some UEs (e.g., UE 130A and UE 130B). Although merely, for simplicity, one donor node is illustrated in FIG. 1A, it is contemplated that IAB system 100 may include more donor node(s) in some other embodiments of the present disclosure. Similarly, although merely four IAB nodes are illustrated in FIG. 1A for simplicity, it is contemplated that IAB system 100 may include more or fewer IAB nodes in some other embodiments of the present disclosure. Although merely two UEs are illustrated in FIG. 1A for simplicity, it is contemplated that IAB system 100 may include more or fewer UEs in some other embodiments of the present disclosure.

IAB node 120A is directly connected to donor node 110. IAB node 120D is directly connected to donor node 110. IAB node 120A can be connected to donor node(s) other than donor node 110 in accordance with some other embodiments of the present disclosure. IAB node 120D can be connected to donor node(s) other than donor node 110 in accordance with some other embodiments of the present disclosure.

IAB node 120C can reach donor node 110 by hopping through IAB node 120D. IAB node 120D is a parent node of IAB node 120C. In other words, IAB node 120C is a child node of IAB node 120D. IAB node 120B can reach donor node 110 by hopping through IAB node 120C and IAB node 120D. IAB node 120C and IAB node 120D are upstream nodes of IAB node 120B, and IAB node 120C is a parent node of IAB node 120B. In other words, IAB node 120B is a child node of IAB node 120C. IAB node 120B and IAB node 120C are downstream nodes of IAB node 120D. UE 130A is directly connected to IAB node 120A, and UE 130B is directly connected to IAB node 120B. In other words, UE 130A and UE 130B are served by IAB node 120A and IAB node 120B, respectively. In some other embodiments of the present disclosure, UE 130A and UE 130B may also be referred to as child nodes of IAB node 120A and IAB node 120B, respectively.

Each of IAB node 120A, IAB node 120B, IAB node 120C, and IAB node 120D may be directly connected to one or more UEs in accordance with some other embodiments of the present disclosure.

Each of IAB node 120A, IAB node 120B, IAB node 120C, and IAB node 120D may be directly connected to one or more IAB nodes in accordance with some other embodiments of the present disclosure.

In the IAB system 100, which provides multi-hop relay, a wireless backhaul link may fail due to, for example but is not limited to, blockage by moving object(s) (e.g., vehicle(s)), foliage (caused by seasonal changes), new building(s) (e.g., infrastructure changes). Such backhaul link failure may occur either on a physically stationary IAB node or a mobile IAB node. Link switching technique has been developed to address this issue.

For example, assuming that a Radio Link Failure (RLF) occurs on the backhaul link between donor node 110 and IAB node 120D, IAB node 120D may establish a link to another donor node (not shown). In other words, IAB node 120D may switch from the link between IAB node 120D and donor node 110 to a link between IAB node 120D and another donor node (not shown).

For example, assuming that an RLF occurs on the backhaul link between two IAB nodes (e.g., IAB node 120D and IAB node 120C), IAB node 120C may establish a link to another IAB node (e.g., IAB node 120A). In other words, IAB node 120C may switch from the link between IAB node 120C and IAB node 120D to a link between IAB node 120C and a candidate IAB node 120A.

Also, traffic variations may create uneven load distribution on wireless backhaul links leading to local link or node congestion.

Figure 1B:
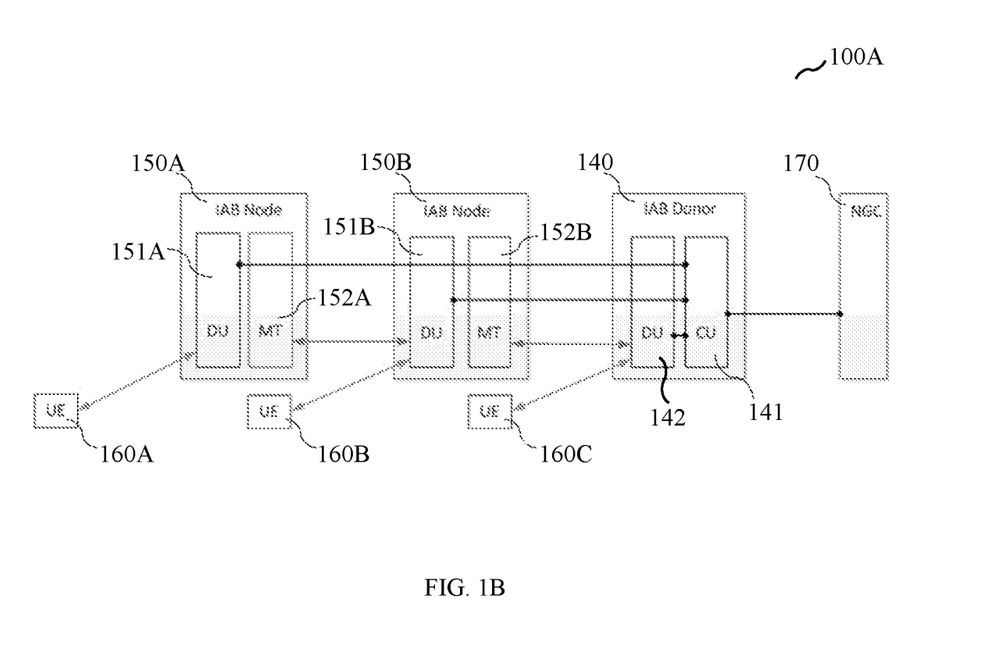
FIG. 1B illustrates an exemplary IAB system according to some other embodiments of the present disclosure.

FIG. 1B illustrates an exemplary IAB system 100A according to some embodiments of the present disclosure.

Referring to FIG. 1B, the IAB system 100A may include IAB donor 140, IAB node 150A, IAB node 150B, UE 160A, UE 160B, UE 160C and a Next-Generation Core (NGC) 170.

Each of the IAB node 150A and IAB node 150B may include a DU and a Mobile Termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 150A may be connected to an upstream IAB node 150B via MT 152A function. IAB node 150A may be connected to UE 160A via the DU 151A.

IAB node 150B may be connected to an upstream IAB node or IAB donor 140 via MT 152B function. IAB node 150B may be connected to UE 160B via DU 151B. IAB node 150B may be connected to downstream IAB node 150A via DU 151B.

In some embodiments of the present disclosure, IAB nodes as shown in FIG. 1B may include Layer-2 (L2) IAB nodes.

Referring back to FIG. 1A, the IAB nodes (e.g., IAB node 120A, IAB node 120B, IAB node 120C, and IAB node 120D) may include L2 IAB nodes.

Referring to FIG. 1B, the BS (e.g., IAB donor 140) may include at least one DU to support UEs and MTs of downstream IAB nodes. A CU 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via F1 interface. In other words, the F1 interface provides means for interconnecting the CU and the DU(s) of an IAB donor. The F1 Application Protocol (F1AP) supports the functions of F1 interface by certain F1AP signaling procedures.

In some embodiments of the present disclosure, CU 141 of the IAB donor 140 is a logical node hosting Radio Resource Control (RRC), Service Data Adaptation Protocol (SDAP) and Packet Data Convergence Protocol (PDCP) layers of the BS. The DU of the BS is a logical node hosting Radio Link Control (RLC) layer, Medium Access Control (MAC) layer and Physical layer (PHY) of the BS. One cell is supported by only one DU of a BS or one DU of an IAB node.

The IAB system 100A is in a standalone (SA) mode, in which each IAB node has only one parent node. In some other embodiments of the present disclosure, an IAB system may be in a non-standalone (NSA) mode, in which one or more IAB nodes may have more than one parent node.

Figure 2:
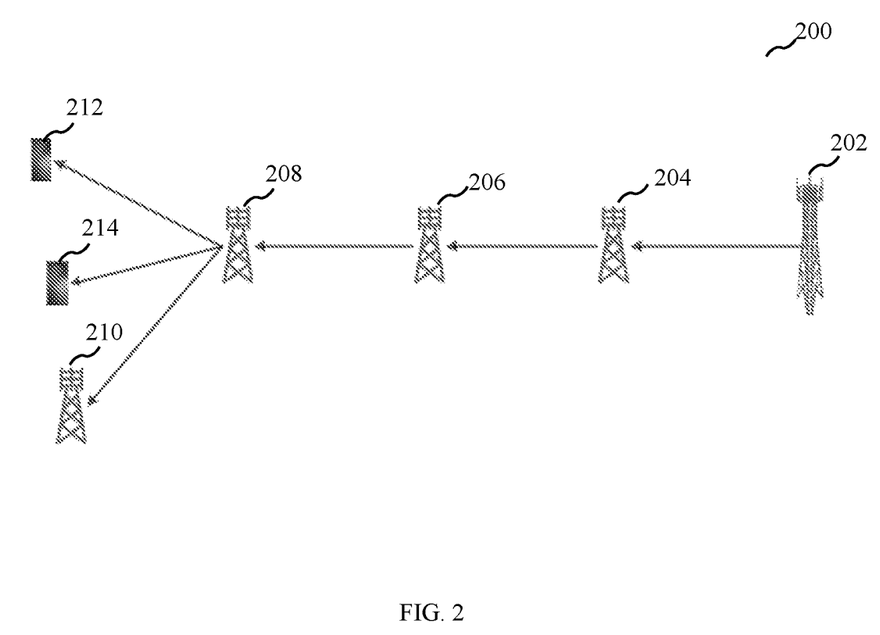
FIG. 2 illustrates an exemplary IAB system in a stand-alone (SA) mode according to some embodiments of the present disclosure.

FIG. 2 illustrates an exemplary IAB system 200 in an SA mode according to some embodiments of the present disclosure.

Referring to FIG. 2, the IAB system 200 may include donor node 202, IAB node 204, IAB node 206, IAB node 208, IAB node 210, UE 212, and UE 214. Although, for simplicity, FIG. 2 merely illustrates downlink communications from upstream nodes to downstream nodes (e.g., from donor node 202 to IAB node 204, from IAB node 204 to IAB node 206, from IAB node 206 to IAB node 208, and from IAB node 208 to UE 212, to UE 214, and to IAB node 210), it is contemplated that uplink communications may exist in the opposite direction.

As illustrated in FIG. 2, a UE (e.g., UE 212 or UE 214) can access donor node 202 via IAB nodes 208, 206, and 204. On the downlink, the DU of an IAB node (e.g., IAB node 206) may not know the downlink buffer status of its child node (e.g., IAB node 208). Congestion may occur at any one of the IAB nodes 208, 206, and 204. For example, assuming that the capacity of the link from IAB node 208 to UE 212 may be less than the capacity of the link from IAB node 206 to IAB node 208, in this scenario, downlink data congestion can occur at IAB node 208 because the ingress data rate from IAB node 206 to IAB node 208 (which is scheduled by the DU of IAB node 206) may be greater than the egress data rate from IAB node 208 to UE 212 (which can be scheduled by the DU of IAB node 208 for UE 212). If congestion occurs at IAB node 208, IAB node 208 may have to discard packet(s), which adversely affects service quality or performance of the IAB system 200.

Similarly, if the capacity of the link from IAB node 206 to IAB node 208 is relatively less than the capacity of the link from IAB node 204 to IAB node 206, congestion and packet discard may occur at IAB node 206.

End-to-end flow control may help to address issues (e.g., packet discard) at the IAB node(s) due to downlink data congestion. To perform end-to-end flow control, the DU of the IAB where downlink data congestion occurs may report the congestion to the CU of the donor node, which can take corresponding action(s) (e.g., reducing the data rate on the downlink) to reduce the congestion.

The congestion may be reported with different granularities. For example, the DU may process data streams for different services (e.g., text service, voice service, audio service, or other service(s)) for different UEs. A data radio bearer (DRB) can be configured for each of the above-mentioned services.

3GPP Specification TS38.475 introduces a downlink data delivery status (DDDS) message, which may be used by a DU to indicate to a CU the congestion associated with a given DRB of a UE which can access the DU. In addition to an identifier for identifying the given DRB, the DDDS message may include the following elements:
a) the highest sequence number of the PDCP protocol data unit (PDU) successfully delivered in sequence to the UE among those PDCP PDUs received from the CU;
d) the desired buffer size in bytes for the given DRB;
c) the minimum buffer size in bytes for the given DRB; and
d) the F1-U packets that were declared as being "lost" by the DU and have not yet been reported to the CU within the previous DDDS messages.

As discussed above, the DDDS message includes information with respect to whether the given DRB has a congestion issue (also referred to as "UE bearer information"). For example, assuming the given DRB has a congestion issue, the accessing IAB node (e.g., IAB node 208), which is directly accessed by the UE (e.g., UE 212 or UE 214), can have information indicating that the given DRB has a congestion issue. Accordingly, the DU of the accessing IAB node (e.g., IAB node 208) can include such information in the DDDS message and transmit the DDDS message to the CU of the donor node (e.g., donor node 202). The CU then can re-schedule the data rate to reduce the congestion for the given DRB.

However, intermediate IAB nodes (e.g., IAB node 204 or IAB node 206) between the accessing IAB node (e.g., IAB node 208) and the donor node (e.g., donor node 202) may not have information regarding the given DRB of the UE. When congestion occurs at the intermediate IAB node(s), they cannot use the legacy DDDS message as described in 3GPP Specification TS38.475 to report the congestion to the CU of the donor node (e.g., donor node 202).

In other words, the congestion report transmitted by a legacy DDDS message may indicate a DRB which has a congestion issue to the CU. Alternatively, the congestion report may indicate a DU which is overloaded to the CU, but not indicate the DRB which has a congestion issue.

3GPP Specification TS38.473 introduces a gNB-DU status indication message, which may be used by a DU to indicate to a CU the congestion associated with the DU. The gNB-DU status indication message includes an element called gNB-DU Overload Information, which may indicate whether the DU is overloaded or not. Unlike the DDDS message, the gNB-DU status indication message does not indicate which DRB causes the overload at the DU. If the CU receives a gNB-DU status indication message indicating that the DU is overloaded, the CU may then take action(s) (e.g., reducing data rate) to reduce the load at the DU.

However, in an IAB system which supports multi-connectivity, a DU of an IAB node may have various links to reach a CU of a donor node, i.e., in a non-standalone (NSA) mode. In such a case, the DU needs to indicate which link is overloaded. However, the legacy gNB-DU status indication message as described in 3GPP Specification TS38.473 does not provide function(s) as discussed above.

Figure 3:
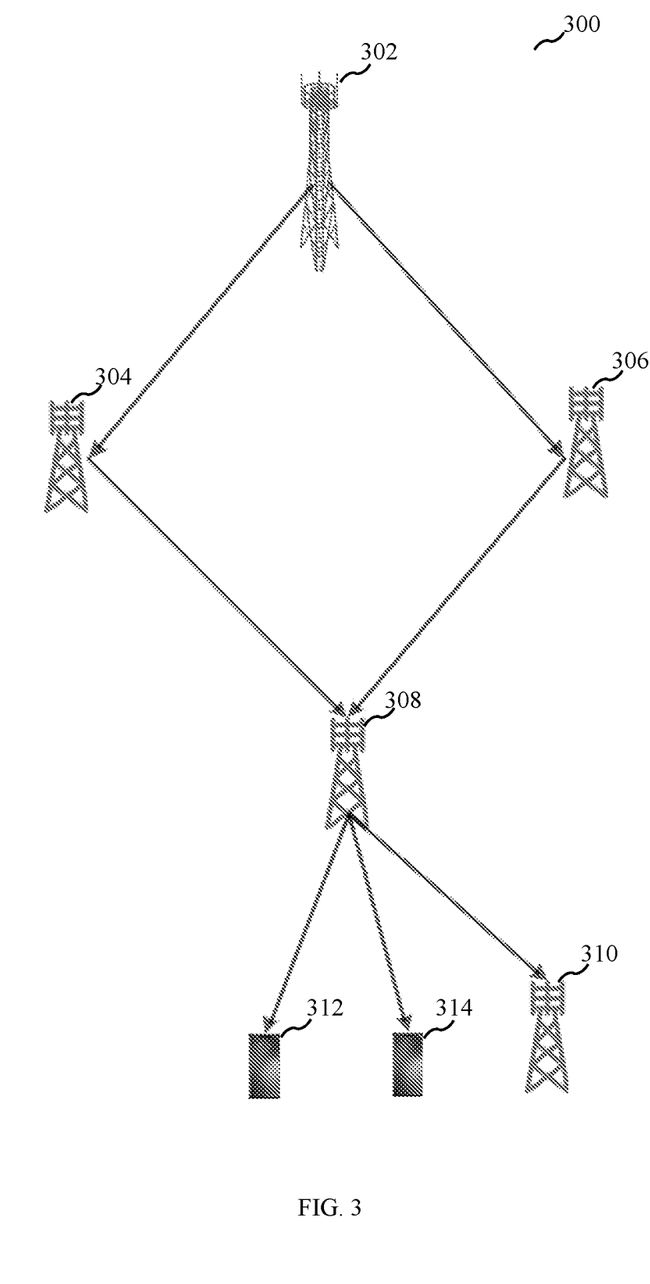
FIG. 3 illustrates an exemplary IAB system in a non-standalone (NSA) mode according to some embodiments of the present disclosure.

FIG. 3 illustrates an exemplary IAB system 300 in a non-standalone (NSA) mode according to some embodiments of the present disclosure.

Referring to FIG. 3, the IAB system 300 may include donor node 302, IAB node 304, IAB node 306, IAB node 308, IAB node 310, UE 312, and UE 314. Although, for simplicity, FIG. 3 merely illustrates downlink communications from upstream nodes to downstream nodes (e.g., from donor node 302 to IAB node 304 and to IAB node 306, from IAB node 304 to IAB node 308, from IAB node 306 to IAB node 308, and from IAB node 308 to UE 312, to UE 314, and to IAB node 310), it is contemplated that uplink communications may exist in the opposite direction. Also, it should be understood that IAB systems in an NSA mode according to some other embodiments of the present disclosure may have various structures other than the exemplary one shown in FIG. 3.

As shown in FIG. 3, IAB node 308 has two parent nodes, i.e., IAB node 304 and IAB node 306. The DU of IAB node 308 may be overloaded due to a data stream transmitted on a link (from IAB node 304 to IAB node 308), or to a data stream transmitted on another link (from IAB node 306 to IAB node 308).

There can be some advantages if the CU of the donor node (e.g., donor node 302) can tell or be aware of a link (either the link from IAB node 304 to IAB node 308 or the link from IAB node 306 to IAB node 308) which causes overload or congestion at the DU of IAB node 308 before reacting to the overload or congestion.

In accordance with some embodiments of the present disclosure, the legacy DDDS and gNB-DU status indication messages may be enhanced to address the above issues in implementing end-to-end flow control in IAB systems, which support multi-hop backhauling and multi-connectivity.

As discussed above, the legacy DDDS message cannot be used by an intermediate IAB node to report congestion associated with a given DRB of a UE because the intermediate IAB node has no information regarding the given DRB. One possible solution to address this issue is to configure information regarding all DRBs in both the accessing IAB node and the intermediate IAB node(s). For example, when the donor node configures a DRB for a service provided to a UE, information regarding the DRB may be signaled to all the IAB nodes, including the accessing IAB node and the intermediate IAB node(s). In this way, the intermediate IAB node(s) can indicate to the donor node congestion associated with the DRB by using a DDDS message including information regarding the DRB. The information regarding the DRB may include identifiers for identifying the UE and the DRB. This solution will result in severe signaling overhead because information regarding all the DRBs needs to be signaled to all the IAB nodes.

According to an embodiment of the present disclosure, different IAB nodes may take different schemes to report congestion to the donor node (e.g., via F1 signaling). For example, if an IAB node (e.g., the accessing IAB node) has information regarding the DRB associated with the congestion occurring at the IAB node, it may transmit a DDDS message including information regarding the DRB to the donor node (e.g., via F1 signaling). If an IAB node (e.g., the intermediate IAB node) has no information regarding the DRB associated with the congestion occurring at the IAB node, it may transmit an enhanced DDDS message to the donor node (e.g., via F1 signaling), which will be described below. Alternatively, according to another embodiment of the present disclosure, an IAB node may transmit an enhanced DDDS message to report congestion, regardless of whether it has information regarding the DRB associated with the congestion occurring at the IAB node.

As stated above, the donor node may configure a DRB for each service provided to a UE. DPUs for a DRB are transmitted through a respective RLC channel. DPUs in an RLC channel are transmitted through a respective logical channel. In other words, each DRB is mapped to (or associated with) a respective RLC channel, and each RLC channel is mapped to (or associated with) a respective logical channel. That is, DRBs have one-to-one correspondence with RLC channels, and also have one-to-one correspondence with logical channels. Although the intermediate IAB nodes may not have information regarding DRBs, they have information regarding RLC channels and logical channels. Given this, the intermediate IAB nodes may transmit an enhanced DDDS message including information regarding RLC channels or logical channels to the donor node for flow control. The accessing IAB node may also transmit such an enhanced DDDS message to the donor node for flow control.

On the downlink, from a given IAB node's perspective, the RLC channel between the given IAB node and a parent node of the given IAB node is referred to as an ingress RLC channel, and the RLC channel between the given IAB node and a child node of the given IAB node is referred to as an egress RLC channel. The enhanced DDDS message may include information regarding the ingress RLC channel, the egress RLC channel, or both.

To indicate an ingress RLC channel associated with congestion occurring at an IAB node, the enhanced DDDS message may include an identifier for identifying the ingress RLC channel or an identifier for identifying the logical channel associated with the ingress RLC channel.

In an IAB system in an SA mode (e.g., FIG. 2), an IAB node has only one parent node. Hence, each ingress RLC channel of the IAB node has a unique RLC channel identifier, and the logical channel associated with the ingress RLC channel has a unique logical channel identifier. In this scenario, an RLC channel identifier or a logical channel identifier is sufficient to identify a unique ingress RLC channel.

However, in an IAB system in a NSA mode (e.g., FIG. 3), one or more IAB nodes may have more than one parent node, and the ingress RLC channels connected to different parent nodes may have the same RLC channel identifier. For example, referring back to the IAB system 300 illustrated in FIG. 3, IAB node 308 has two parent nodes (e.g., IAB node 304 and IAB mode 306). The RLC channel identifier of the RLC channel between IAB node 304 and IAB node 308 may be the same or different from the RLC channel identifier of the RLC channel between IAB node 306 and IAB node 308. In this scenario, an RLC channel identifier or a logical channel identifier is not sufficient to identify a unique ingress RLC channel of IAB node 308. To identify a unique ingress RLC channel, according to some embodiments of the present disclosure, the enhanced DDDS message may include an additional identifier for differentiating which parent node the concerned ingress RLC channel is connected to (i.e., an identifier for identifying the parent node).

In accordance with an embodiment of the present disclosure, the identifier for identifying the parent node may be a cell group (CG) identifier for the parent node. From UEs' perspective, the DU of an IAB node may support one or more cells, i.e., a cell group. A CG identifier used to identify the cell group also can be used to identify the DU or the IAB node. If an IAB node (e.g., IAB node 308) has two parent nodes (e.g., IAB node 304 and IAB node 306), the donor node (e.g., donor node 302) may configure one of the parent nodes (e.g., IAB node 304) as a master node with a CG identifier having a value of "0", and configure the other of the parent nodes (e.g., IAB node 306) as a secondary node with a CG identifier having a value of "1".

In accordance with another embodiment of the present disclosure, the identifier for identifying the parent node may be a cell identifier (e.g., a physical cell identifier (PCI)) for the parent node. As stated above, the DU of an IAB node may support a cell group including one or more cells. Each cell may have a unique cell identifier. Cells of one IAB node have different cell identifiers than cells of another IAB node. Thus, a cell identifier for an IAB node (i.e., a cell identifier of one of the cell(s) supported by an IAB node) may be used to identify the IAB node.

In accordance with yet another embodiment of the present disclosure, the identifier for identifying the parent node may be a backhaul adaption protocol (BAP) entity address for the parent node. For an IAB node, BAP entities are located in the BAP sublayer, which is above the RLC layer. Each BAP entity has a transmitting part and a receiving part. For example, for a RLC channel between IAB node 304 and IAB node 308, there are a pair of BAP entities located at IAB node 304 and IAB node 308, respectively; for a RLC channel between IAB node 306 and IAB node 308, there are another pair of BAP entities located at IAB node 306 and IAB node 308, respectively. BAP entities located at different IAB nodes have different addresses. Thus, a BAP entity address may be used to identify a unique IAB node.

The above examples for identifiers for identifying the parent node are provided for purposes of explanation. It should be understood that the enhanced DDDS message may include other identifiers to identify a parent node associated with an RLC channel.

To indicate an egress RLC channel associated with congestion occurring at an IAB node, the enhanced DDDS message may include an identifier for identifying the egress RLC channel or an identifier for identifying the logical channel associated with the egress RLC channel.

In cases where the IAB node has only one child node, an RLC channel identifier or a logical channel identifier is sufficient to identify a unique egress RLC channel. However, in most cases, an IAB node may have more than one child node. For example, IAB node 208 in FIG. 2 has three child nodes (e.g., IAB node 210, UE 212, and UE 214). IAB node 308 in FIG. 3 also has three child nodes (e.g., IAB node 310, UE 312, and UE 314). In other embodiments of the present disclosure, an IAB node may have more or fewer child nodes.

In the cases where the IAB node has more than one child node, an RLC channel identifier or a logical channel identifier is not sufficient to identify a unique egress RLC channel of the IAB node. To identify a unique egress RLC channel, according to some embodiments of the present disclosure, the enhanced DDDS message may include an additional identifier for differentiating which child node the concerned egress RLC channel is connected to (i.e., an identifier for identifying the child node).

If the child node is a UE, a simple solution is to use a UE identifier, which is globally unique, to identify the child node. However, the UE identifier may be too long to be applicable.

In accordance with an embodiment of the present disclosure, the identifier for identifying a child node of an IAB node may be a combination of an identifier for a cell (e.g., a physical cell identifier) of the IAB node and an identifier allocated by the cell to the child node, which is unique within the cell. In an embodiment of the present disclosure, the identifier allocated by the cell to the child node may be a Cell-Radio Network Temporary Identifier (C-RNTI).

In accordance with another embodiment of the present disclosure, the identifier for identifying a child node of an IAB node may be an identifier allocated by the donor node to the child node. In an embodiment of the present disclosure, the identifier allocated by the donor node to the child node may be a gNB-CU UE F1AP identifier or a gNB-DU UE F1AP identifier. The gNB-CU UE F1AP identifier uniquely identifies a child node of an IAB node over the F1 interface within a CU. The gNB-DU UE F1AP identifier uniquely identifies a child node of an IAB node over the F1 interface within a DU.

In accordance with yet another embodiment of the present disclosure, the identifier for identifying a child node of an IAB node may be a BAP entity address for the child node. For example, for a RLC channel between IAB node 308 and UE 312, there are a pair of BAP entities located at IAB node 308 and UE 312, respectively; for a RLC channel between IAB node 308 and IAB node 310, there are another pair of BAP entities located at IAB node 308 and IAB node 310, respectively. BAP entities located at different nodes have different addresses. Thus, a BAP entity address may be used to identify a unique child node of an IAB node, regardless of whether it is a UE or another IAB node.

The above examples for identifiers for identifying the child node are provided for purposes of explanation. It should be understood that the enhanced DDDS message may include other identifiers to identify a child node associated with an RLC channel.

In one embodiment of the present disclosure, to report congestion occurring at an IAB node in an IAB system, the IAB node may transmit a message (e.g., an enhanced DDDS message) including information regarding an ingress RLC channel associated with the congestion. In another embodiment of the present disclosure, to report congestion occurring at an IAB node in an IAB system, the IAB node may transmit a message (e.g., an enhanced DDDS message) including information regarding an egress RLC channel associated with the congestion. In yet another embodiment of the present disclosure, to report congestion occurring at an IAB node in an IAB system, the IAB node may transmit a message (e.g., an enhanced DDDS message) including information regarding an ingress RLC channel associated with the congestion, information regarding an egress RLC channel associated with the congestion, or both, depending on the structure of the IAB system. For example, if a first IAB node has more than one parent nodes, it may transmit a message including information regarding an ingress RLC channel; if a second IAB node has more than one child nodes, it may transmit a message including information regarding an egress RLC channel; if a third IAB node has more than one parent nodes and more than one child nodes, it may transmit a message including both information regarding an ingress RLC channel and information regarding an egress RLC channel. Prior to transmitting the message to report congestion, the IAB node may determine whether the message to be transmitted is associated with an ingress RLC channel between the IAB node and a parent node of the IAB node, an egress RLC channel between the IAB node and a child node of the IAB node, or both.

According to some embodiments of the present disclosure, the message to report congestion associated with an RLC channel (an ingress RLC channel or an egress RLC channel) may further include the following information:
1) a desired buffer size for the concerned RLC channel;
2) a minimum buffer size for the concerned RLC channel;
3) a desired bit rate for the concerned RLC channel; and
4) a minimum bit rate for the concerned RLC channel.

In accordance with some embodiments of the present disclosure, once the donor node receives, from an IAB node, a message indicating congestion associated with an RLC channel, the donor node will take action(s) to reduce the congestion at the IAB node. For example, the donor node may reduce the downlink data rate of the RLC channel identified in the message.

As discussed above, the legacy gNB-DU status indication message cannot be used by an IAB node having more than one parent node to report congestion or overload at the DU of the IAB node, because the IAB node may receive data from more than one link from its parent nodes (each link corresponds to a parent node) and the legacy gNB-DU status indication message cannot differentiate which link is associated with the overload or congestion. To address this issue, according to an embodiment of the present disclosure, the IAB node may transmit an enhanced gNB-DU status indication message including information regarding its parent node(s) to the donor node (e.g., via F1 signaling) for flow control.

In accordance with an embodiment of the present disclosure, the enhanced gNB-DU status indication message may include a CG identifier for the parent node. As described above, if an IAB node (e.g., IAB node 308) has two parent nodes (e.g., IAB node 304 and IAB node 306), the CG identifier having a value of "0" identifies a master node (e.g., IAB node 304), and the CG identifier having a value of "1" identifies a secondary node (e.g., IAB node 306).

In accordance with another embodiment of the present disclosure, the enhanced gNB-DU status indication message may include a BAP entity address for the parent node. In accordance with yet another embodiment of the present disclosure, the enhanced gNB-DU status indication message may include a cell identifier (e.g., a PCI) for the parent node (i.e., a cell identifier of one of the cell(s) supported by the parent node).

The above examples are provided for purposes of explanation. It should be understood that the enhanced gNB-DU status indication message used to report congestion or overload status of an IAB node may include other identifiers to identify a parent node of the IAB node.

In accordance with some embodiments of the present disclosure, once the donor node receives, from an IAB node, a message indicating congestion associated with a parent node of the IAB node, the donor node will take action(s) to reduce the congestion at the IAB node. For example, the donor node may reduce the downlink data rate from the parent node identified in the message to the IAB node.

According to some embodiments of the present disclosure, when congestion happens at an IAB node, the IAB node may report the congestion to the donor node using a first message (e.g., an enhanced DDDS message as described above) indicating the congestion associated with an RLC channel, a second message (e.g., an enhanced gNB-DU status indication message as described above) including the congestion associated with a parent node of the IAB node, or both. Although DDDS and gNB-DU status indication messages are specifically described herein, those having ordinary skills in the art would understand that other alternative messages may also be used.

Figure 4:
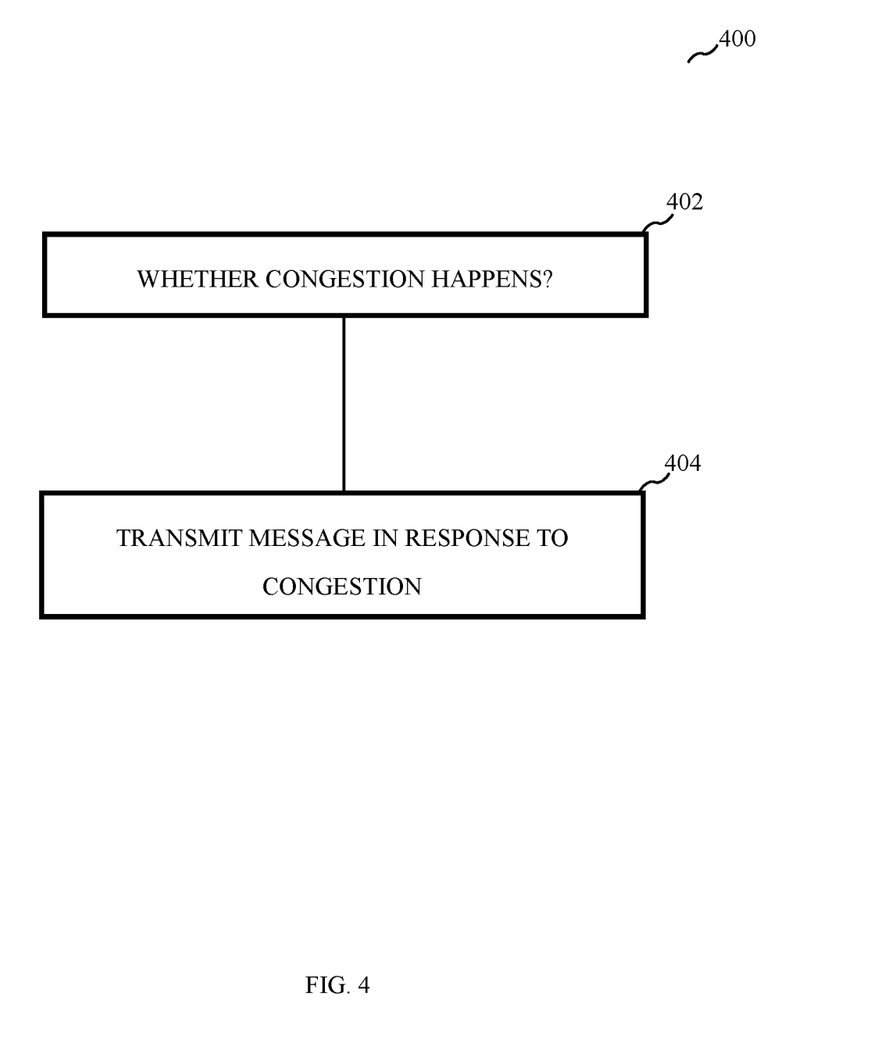
FIG. 4 illustrates an exemplary flow chart of a method for end-to-end flow control according to some embodiments of the present disclosure.

FIG. 4 illustrates an exemplary flow chart of a method 400 for end-to-end flow control according to some embodiments of the present disclosure. Although described with respect to an IAB node, it should be understood that other devices may be configured to perform a method similar to that of FIG. 4.

As shown in FIG. 4, in step 402, an IAB node may determine whether congestion happens at the IAB node. For example, congestion may happen at the IAB node when the ingress downlink data rate from a parent node of the IAB node to the IAB node is larger than the egress downlink data rate from the IAB node to a child node of the IAB node.

In response to determining that the congestion happens at the IAB node, the IAB node may transmit a message to a donor node in step 404, such that the donor node may take an action to reduce the congestion. The message may include at least one of: (1) a first message indicating the congestion associated with an RLC channel; or (2) a second message indicating the congestion associated with a parent node of the IAB node. The first message may be an enhanced DDDS message as described above. The second message may be an enhanced gNB-DU status indication message as described above. By using the message to report congestion occurring at an IAB node to the donor node, end-to-end flow control can be implemented in an IAB system supporting multi-hop backhauling and multi-connectivity.

Figure 5:
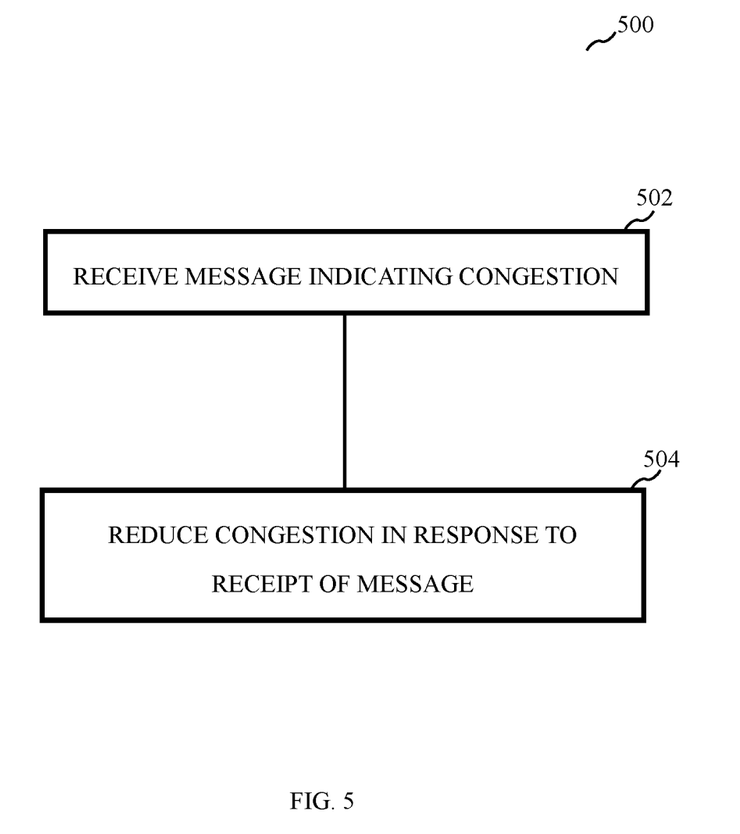
FIG. 5 illustrates an exemplary flow chart of a method for end-to-end flow control according to some embodiments of the present disclosure.

FIG. 5 illustrates an exemplary flow chart of a method 500 for end-to-end flow control according to some embodiments of the present disclosure. Although described with respect to a donor node, it should be understood that other devices may be configured to perform a method similar to that of FIG. 5.

As shown in FIG. 5, in step 502, a donor node may receive a message indicating that congestion happens at an IAB node. The message may include at least one of: (1) a first message indicating the congestion associated with an RLC channel; or (2) a second message indicating the congestion associated with a parent node of the IAB node. The first message may be an enhanced DDDS message as described above. The second message may be an enhanced gNB-DU status indication message as described above.

The message enables the donor node to determine that the congestion happens at the IAB node. In response to receiving the message, in step 502, the donor node may take an action to reduce the congestion at the IAB node. For example, the donor node may reduce the downlink data rate of the RLC channel identified in the first message, or reduce the downlink data rate from the parent node identified in the second message to the IAB node.

Figure 6:
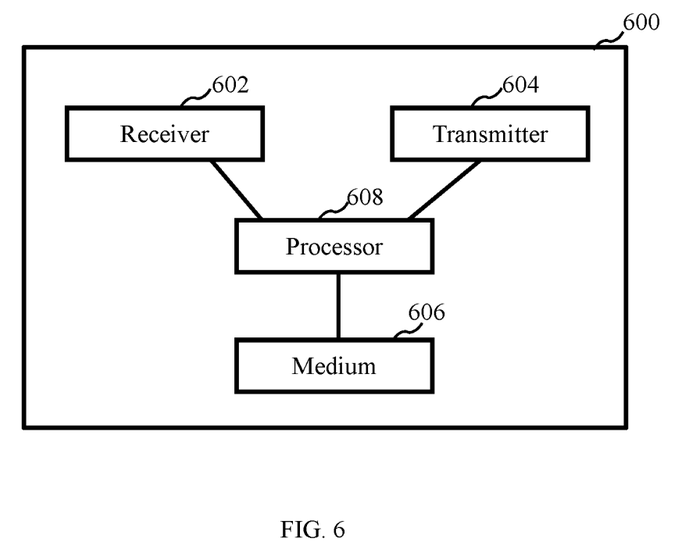
FIG. 6 illustrates an exemplary block diagram of an apparatus according to some embodiments of the present disclosure.

FIG. 6 illustrates an exemplary block diagram of an apparatus 600 according to some embodiments of the present disclosure. In some embodiments of the present disclosure, the apparatus 600 may be an IAB node, which can at least perform the method illustrated in FIG. 4.

As shown in FIG. 6, the apparatus 600 may include a receiver 602, a transmitter 604, a non-transitory computer-readable medium 606, and a processor 608 coupled to the receiver 602, the transmitter 604, and the non-transitory computer-readable medium 606.

Although in FIG. 6, elements such as receiver 602, transmitter 604, non-transitory computer-readable medium 606, and processor 608 are described in the singular, the plural is contemplated unless limitation to the singular is explicitly stated. In some embodiments of the present disclosure, the receiver 602 and the transmitter 604 are combined into a single device, such as a transceiver. In certain embodiments of the present disclosure, the apparatus 600 may further include an input device, a memory, and/or other components.

In some embodiments of the present disclosure, the non-transitory computer-readable medium 606 may have stored thereon computer-executable instructions which are programmed to implement the steps of the methods, for example as described in view of FIG. 4, with the receiver 602, the transmitter 604, and the processor 608.

Figure 7:
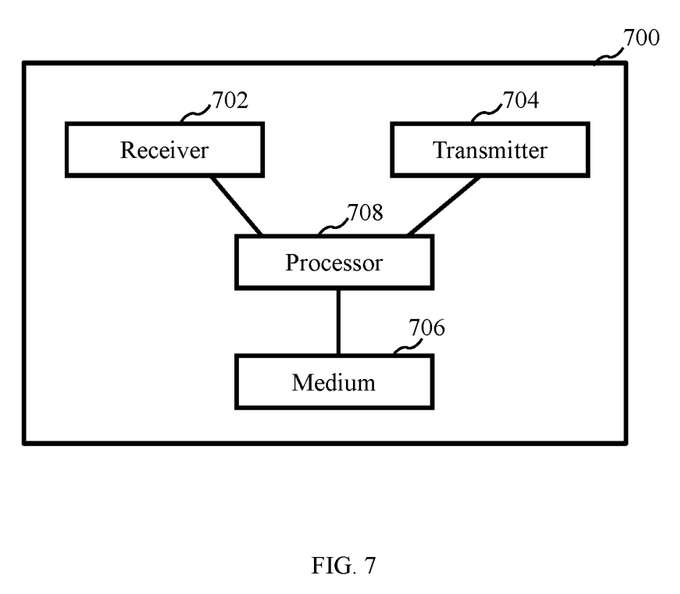
FIG. 7 illustrates an exemplary block diagram of an apparatus according to some other embodiments of the present disclosure.

FIG. 7 illustrates an exemplary block diagram of an apparatus 700 according to some embodiments of the present disclosure. In some embodiments of the present disclosure, the apparatus 700 may be a donor node, which can at least perform the method illustrated in FIG. 5.

As shown in FIG. 7, the apparatus 700 may include a receiver 702, a transmitter 704, a non-transitory computer-readable medium 706, and a processor 708 coupled to the receiver 702, the transmitter 704, and the non-transitory computer-readable medium 706.

Although in FIG. 7, elements such as receiver 702, transmitter 704, non-transitory computer-readable medium 706, and processor 708 are described in the singular, the plural is contemplated unless limitation to the singular is explicitly stated. In some embodiments of the present disclosure, the receiver 702 and the transmitter 704 are combined into a single device, such as a transceiver. In certain embodiments of the present disclosure, the apparatus 700 may further include an input device, a memory, and/or other components.

In some embodiments of the present disclosure, the non-transitory computer-readable medium 706 may have stored thereon computer-executable instructions which are programmed to implement the steps of the methods, for example as described in view of FIG. 5, with the receiver 702, the transmitter 704, and the processor 708.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method comprising:
   determining whether congestion happens at an integrated access and backhaul (IAB) node by comparing an ingress downlink data rate from a parent node of the IAB node to the IAB node to an egress downlink data rate from the IAB node to at least one of a child node of the IAB node and a user equipment (UE); and
   transmitting a message to a donor node in response to determining that the congestion happens at the IAB node, wherein the message comprises:
      a first message indicating the congestion associated with a radio link control channel;
      a second message indicating the congestion associated with a parent node of the IAB node;
      or a combination thereof.

2. The method of claim 1, wherein the first message comprises user equipment bearer information if the user equipment bearer information is available at the IAB node.

3. The method of claim 1, wherein the first message comprising an identifier for identifying the radio link control channel associated with the congestion or an identifier for identifying a logical channel associated with the radio link control channel.

4. The method of claim 3, wherein the radio link control channel associated with the congestion is an ingress radio link control channel between the IAB node and a first parent node of the IAB node, and the first message further comprises an identifier for identifying the first parent node.

5. The method of claim 4, wherein the identifier for identifying the first parent node comprises a cell group identifier for the first parent node, a cell identifier for the first parent node, or a backhaul adaption protocol entity address for the first parent node.

6. The method of claim 3, wherein the radio link control channel associated with the congestion is an egress radio link control channel between the IAB node and a first child node of the IAB node, the first message further comprises an identifier for identifying the first child node.

7. The method of claim 6, wherein the identifier for identifying the first child node comprises a combination of an identifier for a cell of the IAB node and an identifier allocated by the cell to the first child node.

8. The method of claim 6, wherein the identifier for identifying the first child node comprises an identifier allocated by the donor node to the first child node or a backhaul adaption protocol entity address for the first child node.

9. The method of claim 1, further comprising prior to transmitting the first message, determining whether the first message is associated with an ingress radio link control channel between the IAB node and a parent node of the IAB node, an egress radio link control channel between the IAB node and a child node of the IAB node, or both.

10. The method of claim 1, wherein the first message comprises:
    a desired buffer size for the radio link control channel;
    a minimum buffer size for the radio link control channel;
    a desired bit rate for the radio link control channel; and
    a minimum bit rate for the radio link control channel.

11. The method of claim 1, wherein the second message comprises a cell group identifier for the parent node, a backhaul adaption protocol entity address for the parent node, or a cell identifier for the parent node, and the cell identifier comprises a physical cell identifier.

12. An apparatus, the apparatus comprising:
    at least one memory; and
    at least one processor coupled with the at least one memory and configured to cause the apparatus to:
       receive, at a donor node, a message indicating that congestion happens at an integrated access and backhaul (IAB) node, wherein the message:
          comprises:
             a first message indicating the congestion associated with a radio link control channel;
             a second message indicating the congestion associated with a parent node of the IAB node;
             or a combination thereof; and
          is received in response to a comparison of an ingress downlink data rate from the parent node to the IAB node to an egress downlink data rate from the IAB node to at least one of a child node of the IAB node and a user equipment (UE); and
       take an action to reduce the congestion at the IAB node in response to receiving the message.

13. The apparatus of claim 12, wherein the first message comprises user equipment bearer information if the user equipment bearer information is available at the IAB node.

14. The apparatus of claim 12, wherein the first message comprising an identifier for identifying the radio link control channel associated with the congestion or an identifier for identifying a logical channel associated with the radio link control channel.

15. The apparatus of claim 14, wherein the radio link control channel associated with the congestion is an ingress radio link control channel between the IAB node and a first parent node of the IAB node, and the first message further comprises an identifier for identifying the first parent node.

16. The apparatus of claim 14, wherein the radio link control channel associated with the congestion is an egress radio link control channel between the IAB node and a first child node of the IAB node, and the first message further comprises an identifier for identifying the first child node, and the identifier for identifying the first child node comprises a combination of an identifier for a cell of the IAB node and an identifier allocated by the cell to the first child node.

17. The apparatus of claim 12, wherein the first message comprises:
 a desired buffer size for the radio link control channel;
 a minimum buffer size for the radio link control channel;
 a desired bit rate for the radio link control channel; and
 a minimum bit rate for the radio link control channel.

18. The apparatus of claim 12, wherein the second message comprises a cell group identifier for the parent node, a backhaul adaption protocol entity address for the parent node, or a cell identifier for the parent node, and the cell identifier comprises a physical cell identifier.

19. The apparatus of claim 18, wherein the cell identifier comprises a physical cell identifier.

20. An apparatus, the apparatus comprising:
 at least one memory; and
 at least one processor coupled with the at least one memory and configured to cause the apparatus to:
  determine whether congestion happens at an integrated access and backhaul (IAB) node by comparing an ingress downlink data rate from a parent node of the IAB node to the IAB node to an egress downlink data rate from the IAB node to at least one of a child node of the IAB node and a user equipment (UE); and
  transmit a message to a donor node in response to determining that the congestion happens at the IAB node, wherein the message comprises:
   a first message indicating the congestion associated with a radio link control channel;
   a second message indicating the congestion associated with a parent node of the IAB node;
   or a combination thereof.

* * * * *